United States Patent [19]

Oishi et al.

[11] Patent Number: 4,549,398
[45] Date of Patent: Oct. 29, 1985

[54] EXHAUST GAS CLEANING DEVICE FOR DIESEL ENGINES

[75] Inventors: Kiyohiko Oishi, Susono; Kiyoshi Kobashi; Kenichirou Takama, both of Mishima, all of Japan

[73] Assignee: Toyota Jidosha Kogyo Kabushiki Kaisha, Toyota, Japan

[21] Appl. No.: 347,424

[22] Filed: Feb. 10, 1982

[30] Foreign Application Priority Data

Jun. 22, 1981 [JP] Japan .................................. 56-95215
Jun. 22, 1981 [JP] Japan .................................. 56-95216

[51] Int. Cl.⁴ ............................................... F01N 3/02
[52] U.S. Cl. ........................................ 60/286; 55/283; 55/466; 55/DIG. 10; 55/DIG. 30; 60/297; 60/303; 60/311; 219/354; 219/376; 219/539; 219/553
[58] Field of Search ................. 60/274, 286, 300, 297, 60/303, 311; 55/283, 466, DIG. 10, DIG. 30; 219/350, 382, 376, 354, 375, 543, 553, 539

[56] References Cited

U.S. PATENT DOCUMENTS 1,789,812  1/1931  Frazer .................................. 60/300
3,503,716  3/1970  Berger .................................. 60/297
3,934,117  1/1976  Schladitz ............................. 219/382
4,105,530  8/1978  Johnson ........................... 204/290 R
4,319,896  3/1982  Sweeney ............................... 60/300
4,427,418  1/1984  Kogiso .................................. 60/311

FOREIGN PATENT DOCUMENTS 2756570  9/1978  Fed. Rep. of Germany ........ 60/299
  72212  6/1981  Japan .................................... 60/311

Primary Examiner—Douglas Hart
Attorney, Agent, or Firm—Oblon, Fisher, Spivak, McClelland & Maier

[57] ABSTRACT

An exhaust particle cleaning device for a diesel engine includes a trap case provided in a passage way of exhaust gas. A filter material is disposed in the trap case so that carbon particles or other exhaust particles contained in the exhaust gas can be caught within the filter material during the time the exhaust gas is passed through the filter material. A plurality of electric heater elements are spread or dispersed on the upstream end face of the filter material, so that the exhaust gas passes through the areas defined between the plurality of heater elements. The electric heater element may be coated with a ceramic material.

3 Claims, 14 Drawing Figures

EXHAUST GAS CLEANING DEVICE FOR DIESEL ENGINES

BACKGROUND OF THE INVENTION (1) Field of the Invention

This invention generally relates to an exhaust gas cleaning device for diesel engines of motor vehicles, and more particularly relates to a device having filter means capable of physically catching carbon particles or the like (hereinafter, referred to as exhaust particles) contained in the exhaust gas and means for burning and removing periodically the caught exhaust particles, thereby regenerating the capability of the filter means.

(2) Description of the Prior Arts

Exhaust particles in the exhaust emmisions of diesel engines contain considerable amounts of combustible substances, such as carbon particles or the like, as well as other harmful substances. Hitherto, various kinds of devices have been proposed and used for catching such combustible particles by using an appropriate filter element and then burning and removing the caught particles in order to restore the capability of the filter elements. Especially, the methods described below are known in the prior art and there are some defects in each method.

1. A method for throttling an intake passage to reduce the flow of suction air and to raise the temperature of the exhaust gas, thereby burning the exhaust particles contained therein. According to this method, when the engine is running at a heavy load condition the temperature of the exhaust gas is raised enough so that it is possible to burn the exhaust particles. However, when the engine is running at a low load condition, the temperature of the exhaust gas is not raised enough and, therefore, it is impossible to burn out the exhaust particles and to regenerate the capability of filter material.

2. A method for providing an oil burner in the exhaust system and for raising the temperature of the exhaust gas to burn the exhaust particles. According to this method, a large amount of hydrocarbon (HC) is generated when the burner is ignited and, therefore, there are some problems relating to the durability, safety, cost and so on of the oil burner. There has also been known a system having dual exhaust systems, in which the flow of the exhaust gas is stopped in either of the exhaust systems and the exhaust particles are burned in the exhaust system in which the exhaust gas has been stopped. Such a system is, however, expensive and complicated in construction.

3. A method for providing electric heaters on the surface of the filter material to ignite the exhaust particles attached thereto and to introduce the energy thus released to the inside area of the filter to burn the exhaust particles accumulated therein. According to this method, a considerable amount of electricity is required, since the electric heaters must be attached to the entire surface of the filter material, so that it is not feasible to employ this device in motor vehicles. In order to reduce the consumption of electricity, the exhaust system must be a so-called dual type, in which one of the exhaust passages is closed to stop the flow of the exhaust gas, so that the exhaust particulates accumulated in a filter of the closed exhaust passage can be burned. Such a system is, however, complicated in construction and expensive.

SUMMARY OF THE INVENTION

An object of the present invention is to provide a cleaning device for exhaust particles of a diesel engine capable of overcoming the defects mentioned above.

Another object of the present invention is to provide a cleaning device for exhaust particles of a diesel engine, in which device durability and safety are increased.

A further object of the present invention is to provide a cleaning device for exhaust particles of a diesel engine which can be manufactured at a low cost and which is simple in construction.

According to an aspect of the present invention, there is provided a cleaning device for exhaust particles of a diesel engine comprising: a trap case provided in a passageway of the exhaust gas; a filter material disposed in said trap case so that carbon particles or other exhaust particles contained in the exhaust gas can be caught within said filter material during the time the exhaust gas passes through said filter material; a plurality of electric heater elements spread or dispersed on the upstream end face of said filter material, so that the exhaust gas passes through the areas between said plurality of heater elements; and means for electrically controlling said plurality of heater elements. The device may further comprise a honeycomb shaped ceramic filter disposed at the upstream side of said filter material and said plurality of heater elements may be secured between said filter material and said honeycomb shaped ceramic filter.

According to another aspect of the present invention, there is provided a cleaning device for exhaust particles of a diesel engine comprising: a trap case provided in a passageway of the exhaust gas; a filter material disposed in said trap case so that carbon particles or other exhaust particles contained in the exhaust gas can be caught within said filter material during the time the exhaust gas passes through said filter material; a plurality of ceramic heater elements spread or dispersed on the upstream end face of said filter material, so that the exhaust gas passes through the areas between said plurality of ceramic heater elements; each of said ceramic heaters elements comprising an electric filament or the like coated with a ceramic material; and means for electrically controlling said plurality of heater elements. A catalytic agent may be provided on the outer surface of each of said ceramic heater elements. Each ceramic heater element may be formed in a shape of a cross and may be arranged so that the shape of the cross is seen from the direction of the exhaust gas flow.

DETAILED DESCRIPTION OF PREFERRED EMBODIMENTS

Figure 1:
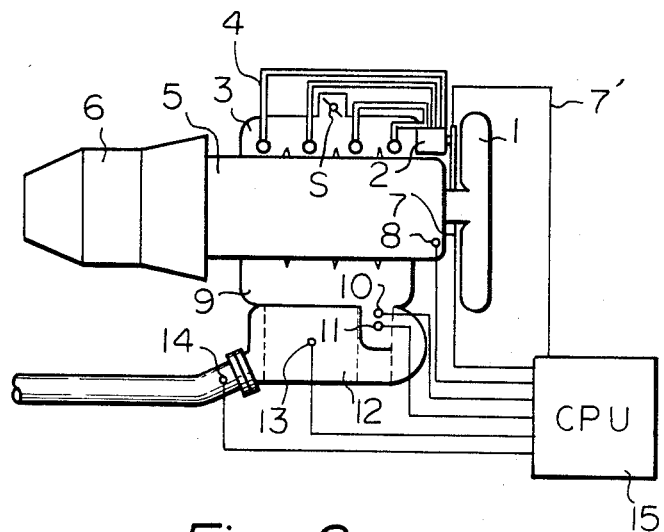
FIG. 1 is a schematic illustration of a diesel engine provided with a cleaning device for exhaust particles of the present invention.

Referring now to FIG. 1, reference numeral 1 designates a cooling fan of a diesel engine; 2, a fuel injection pump; 3, an intake manifold; 4, fuel pipes; 5, a main body of the diesel engine; 6, a transmission; 7, a detection signal line for engine revolution; 7', a detection signal line for engine load; 8, a detection signal line for engine cooling water temperature; 9, an exhaust manifold; 10, a detection signal line for exhaust gas pressure; 11, a detection signal line for exhaust gas temperature; 12, a trap case; 13, a detection signal line for the temperature on the inside of the trap case; 14, a detection signal line for exhaust gas temperature downstream of the trap case 12; and 15, a micro-computer (CPU). These detection signal lines 7, 7', 8, 10, 11, 13 and 14 are connected to conventionally known sensors, respectively, and each detected value is input to the micro-computer (CPU) 15.

Figure 2:
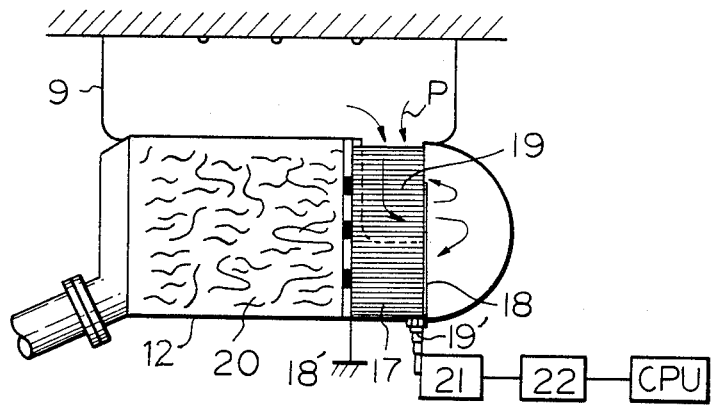
FIG. 2 is a cross-sectional view of a trap case according to the present invention.
Figure 3:
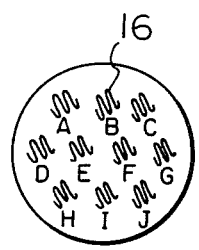
FIG. 3 is a view showing an arrangement of the electric heater elements.

In FIGS. 1 and 2, the trap case 12 is located at the downstream area of and near to a collecting portion of the exhaust manifold 9. The trap case 12 is formed integrally with the exhaust manifold 9 by a means, such as molding. The trap case 12 may be however, located in an exhaust pipe which is connected to the exhaust manifold 9 at the downstream side thereof. The trap case 12 is provided with a filter material 20 therein. Any suitable ceramic foam known in the art or other ceramic materials like this can be used as the filter material 20. In other words, the filter material 20 is a three-dimensional mesh structure through which exhaust gas can be freely passed and the exhaust particles contained in the exhaust gas can be trapped or caught in said mesh structure. At the upper stream end face of the filter material 20, there are ten electric heater elements 16 dispersed, as illustrated in FIG. 3. Each electric heater element 16 does not comprise a coil winding, as does a usual electric heater, but comprises a plane zigzag heater element. In order to mount such a plurality of electric heater elements 16 on the filter material 20, the heater elements 16 are secured to a honeycomb ceramic filter 17, and then the latter is attached to the end face of the filter material 20, so that the heater elements 16 are spread or dispersed between the honeycomb ceramic filter 17 and the filter material 20. The ceramic filter 17 serves only to mount the electric heater elements 16 and has a honeycomb cross-sectional shape, including a plurality of recesses in the direction of the exhaust gas flow. The electric heater elements 16 are spread or dispersed so that the exhaust gas can be freely passed to the entire area containing the filter material 20 through the spaces between the heater elements 16. Each electric heater element 16 comprises a heater filament, well known in the prior art, and electric lines 18 and 19 are used for supplying electricity to the respective electric heater elements 16.

In FIG. 2, reference numeral 18' designates a common earth terminal of the electric heater elements 16; 19' designates electric terminals provided for each heater element 16; 21 designates a battery; and 22 designates a relay for controlling the electric heaters 16. The ten electric heater elements 16 are energized one by one in turn, such as A, B, C, ..., J (FIG. 3). The size or the arrangement of the heater elements 16 may be selected so as not to disturb the current of the exhaust gas, which consequently minimizes the increase of the back pressure of exhaust gas.

Figure 4:
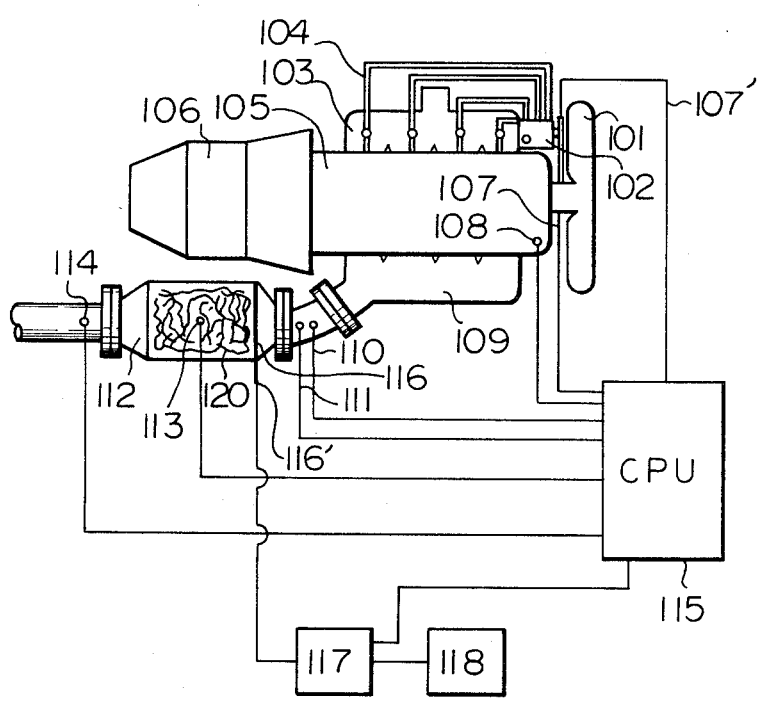
FIG. 4 is a schematic illustration of a diesel engine provided with another embodiment of a cleaning device for exhaust particles.

Referring now to FIG. 4, there is shown another embodiment of this invention, in which reference numeral 101 designates a cooling fan of the diesel engine; 102, a fuel injection pump; 103, an intake manifold; 104, fuel pipes; 105, an engine body; 106, a transmission; 107, a detection signal line for detecting engine revolutions; 107', a detection signal line for detecting engine load; 108, a detection signal line for detecting the temperature of the engine cooling water; 109, an exhaust manifold; 110, a detection signal line for detecting exhaust gas pressure; 111, a detection signal line for detecting exhaust gas temperature; 112, a trap case; 113, a detection signal line for detecting the temperature inside the filter material; 114, a detection signal line for the temperature of the exhaust gas; and 115, a micro-computer (CPU). These detection signal lines 107, 107', 108, 110, 111, 113 and 114 are connected to conventionally known sensors, respectively, and each detected value is input to the micro-computer (CPU) 115.

Figure 5:
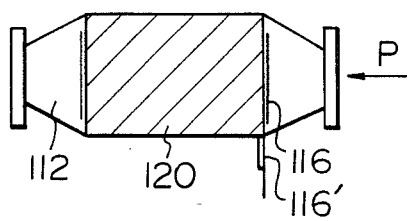
FIG. 5 is a cross-sectional view of another trap case according to the present invention.
Figure 6:
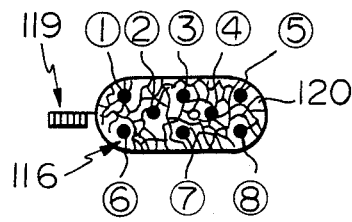
FIG. 6 is a view showing an arrangement of an embodiment of the ceramic heater elements.
Figure 8:
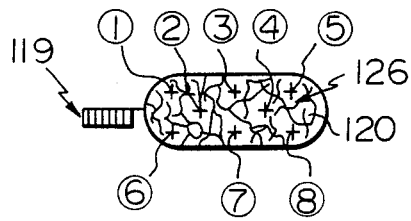
FIG. 8 is a view showing an arrangement of another ceramic heater elements.

The trap case 112 is located at the position of the exhaust pipe, immediately downstream of the exhaust manifold 109. This trap case 112 may be, however, integrally moulded with the exhaust manifold 109 so that it is located at the downstream area of the collecting portion of the exhaust manifold 109. In the trap case 112, there is provided a filter material 120. Any known expanded ceramic foam or other materials like this may be employed as the filter material 120. The structure of this material 120 may be the same as the filter material 20 as mentioned hereinbefore. As shown in FIGS. 4 and 5, at the upstream end face of the filter material 120, ceramic heater elements 116 are spread or dispersed, as illustrated in FIGS. 6 or 8. In FIG. 4, reference numeral 116' designates electric terminals, one provided for each ceramic heater element 116 to apply electricity thereto; 117, designates a relay for the ceramic heater elements; and 118, designates a battery for the ceramic heater elements 116.

Figure 7:
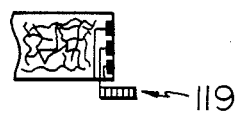
FIG. 7 is a schematic cross-sectional view of the device shown in FIG. 6.

Respective embodiments of the ceramic heater elements are illustrated in FIGS. 6 through 10. FIG. 6 is a front view illustrating an arrangement of the ceramic heater elements and FIG. 7 is a partial cross-sectional view of said arrangement. As seen from FIG. 6, eight ceramic heater elements 116 are spread or dispersed on the upstream end face of the filter material 120. Each heater element 116 is inserted and fixed in concaves or recesses provided at areas on the upstream end face of the filter material 120. Otherwise, the ceramic heater elements 116 may be integrally formed when the filter material 120 is moulded. Each ceramic heater element 116 comprises a suitable electric element, such as for instance, a tungsten filament coated with a material, such as aluminum foil, and further coated with a ceramic material. The size of each of such heater element 116 and the arrangement thereof are selected so that the current of exhaust gas is not disturbed and, therefore, the increase of the back pressure of exhaust gas is minimized. It is desired that a catalyst be carried on the ceramic heater elements 116, whereby ignition can be smoothly exerted and the required energy may be reduced.

Figure 9:
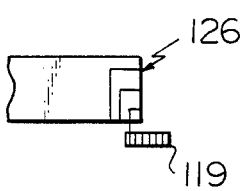
FIG. 9 is a schematic cross-sectional view of the device shown in FIG. 8.
Figure 10:
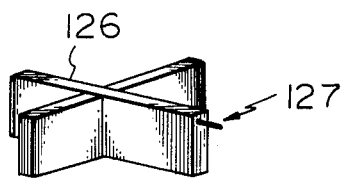
FIG. 10 is a perspective view of a cross-shaped ceramic heater element.

FIG. 8 is a front view illustrating another embodiment of the arrangement of the ceramic heater elements and FIG. 9 is a partial cross-sectional view of the arrangement. In addition, FIG. 10 is an enlarged perspective view of a ceramic heater element. In this embodiment, each ceramic element 126 is formed in the shape of a cross as illustrated in FIGS. 8 and 9, contrary to the embodiment shown in FIGS. 6 and 7. The cross-shaped ceramic element 126 may be made of a suitable electric element, such as, for instance, a tungsten filament coated with aluminum foil and further coated with a ceramic material. Each cross-shaped ceramic heater element 126 is arranged so that the shape of the cross is seen from the direction of the exhaust gas flow, as indicated by an arrow P in FIG. 5. Such cross shaped heater elements 126 may also be mounted on the filter material 120 or integrally formed, in the same manner as the ceramic heater element 116 described above. In accordance with such an arrangement of the ceramic heaters 126 as shown in FIG. 8, it is possible to obtain a wide area through which the exhaust gas flows and to prevent an increase of the back pressure of the exhaust gas. In FIGS. 6, 7, 8 and 9, reference numeral 119 designates electric terminals, and in FIG. 10, reference numeral 127 designates an input terminal for the cross-shaped ceramic heater element 126. The eight ceramic heater elements 116 or 126 are energized one by one in turn, such as Nos. 1, 2, 3, . . . 8 (FIGS. 6 and 8).

Figure 11:
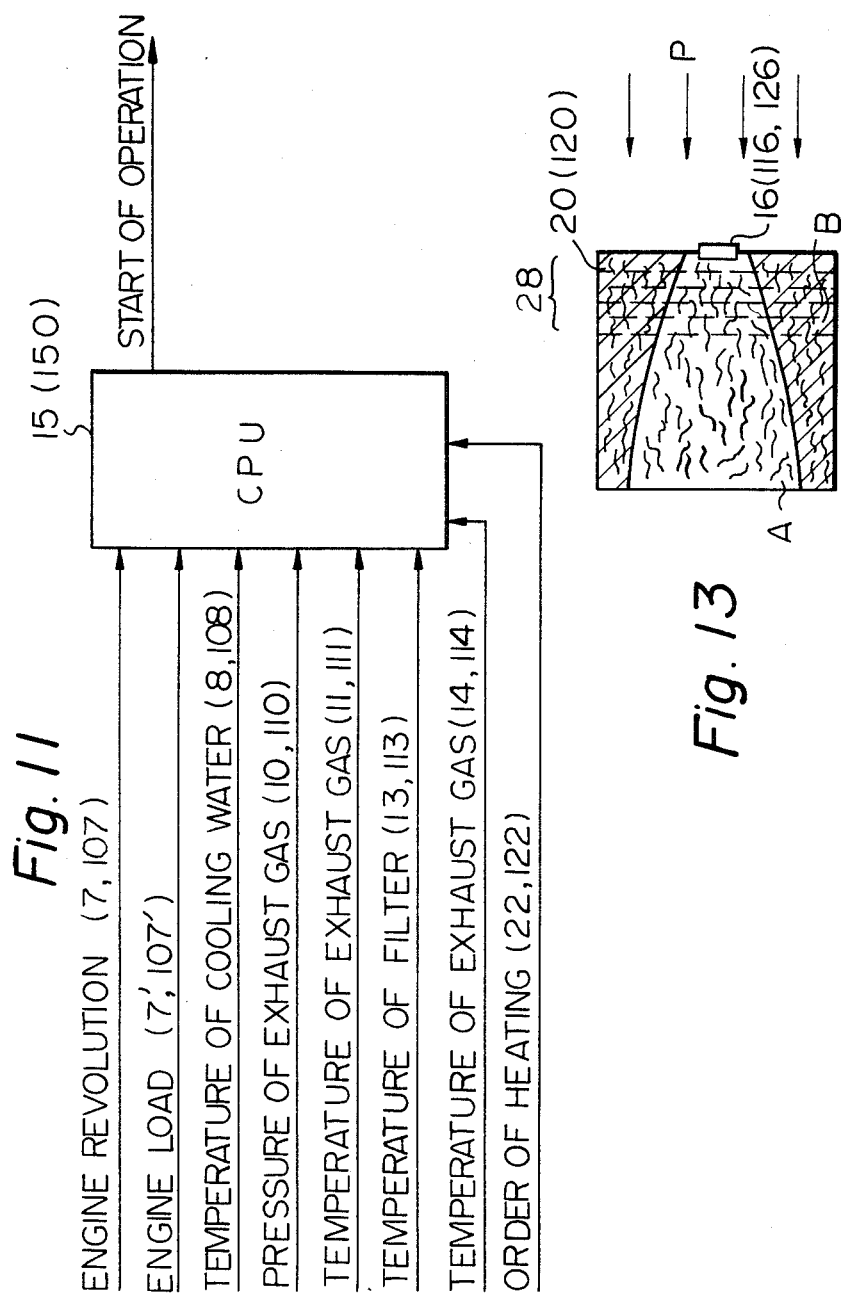
FIG. 11 is a view illustrating the input and the output information for a micro-computer (CPU)

As already described hereinbefore and illustrated in FIG. 11, output signals from the respective sensors (not shown) through the lines 7, 7', 8, 10, 11, 13, and 14 are input to the micro-computor (CPU), in a manner well known in the prior art.

Figure 12:
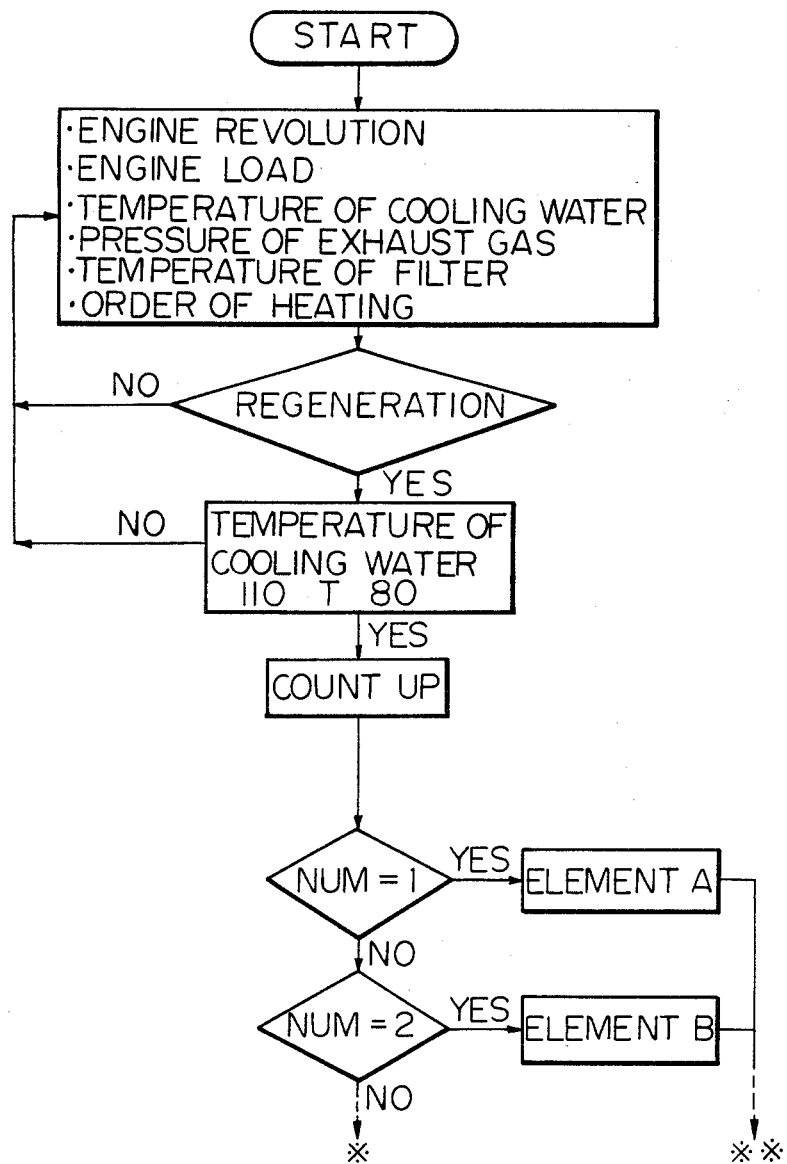
FIGS. 12A and 12B are flow charts illustrating a process for burning exhaust particles and regenerating the capability of the filter means; and, FIG. 13 is a schematic view illustrating a process for burning exhaust particles with an electric heater element.
Figure 12B:
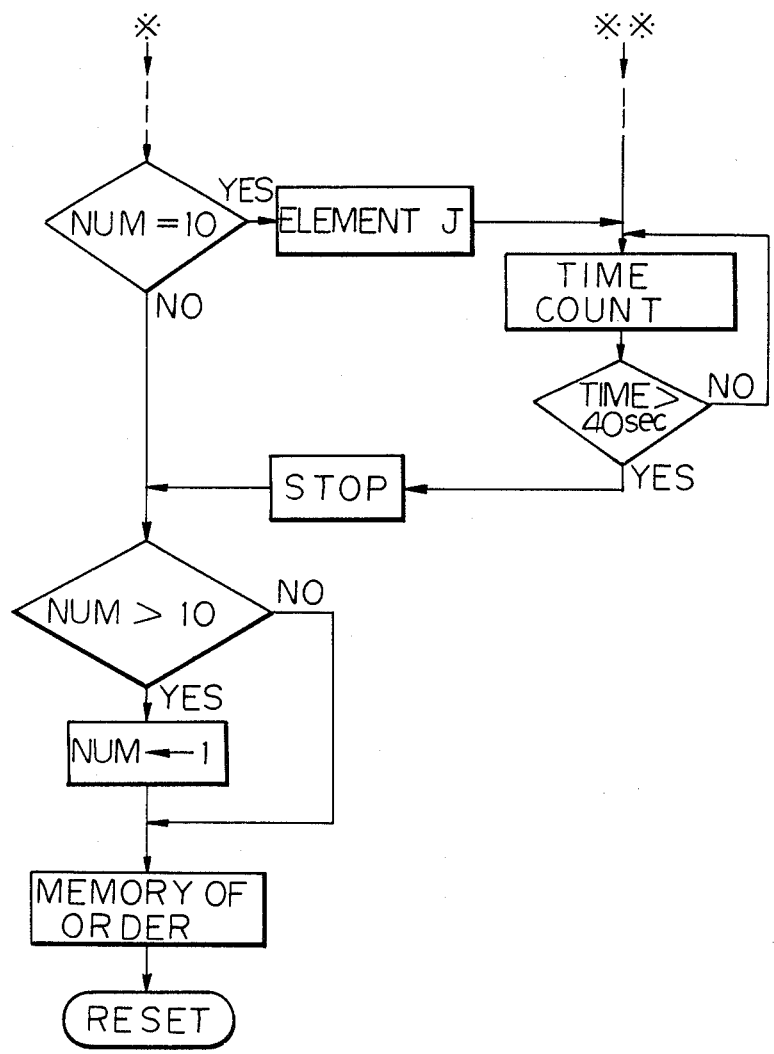

FIG. 12 is a flow chart illustrating the operation of the regeneration of the trap material of this invention. At first, various information, such as the engine revolutional speed (7, 107), the engine load (7', 107'), the temperature of engine cooling water (8, 108), the exhaust gas pressure at the upstream side of the trap (10, 110), the temperature of the filter material (13, 113), the order for energizing the heater elements and so on are input to the micro-computer (CPU) 15 or 115. The time for starting the operation is determined in accordance with the pressure of the exhaust gas. The exhaust gas discharged from the diesel engine flows as shown by an arrow P in FIGS. 2 and 5, and particles contained therein are caught or trapped in the filter material 20 or 120. The pressure of the exhaust gas at the upper area of the trap case (12,112) is increased in accordance with the amount of trapped particles. The pressure of the exhaust gas (10, 110) would be an accurate parameter of the amount of particles trapped or accumulated in the filter material 20 or 120. If the pressure of the exhaust gas is more than a prescribed value, then the temperature of the engine cooling water (8,108) is checked so as not to start the operation of regeneration immediately after the engine is started. When the temperature of the engine cooling water is less than 110° C. and more than 80° C., a count up process is started to determine the order in which the energization of the heater elements (A, B, . . . , J or 1, 2, . . . 8) with electricity should be started. After the expiration of forty seconds, the energization of the heater elements with electricity is stopped and the number of the last heater element is memorized and then the operation of regeneration is reset. If, after the reset, it is considered that regeneration is still necessary, the energization of the heater element with electricity is started again from the heater element next to the one where the last process was stopped, and the same process as described above is carried out again until the regeneration becomes unnecessary.

The range of the engine rotational speed at which the process of regeneration is started is not restricted, but it is desirable that the process of regeneration be started when the engine is running at a no-load idle condition.

FIG. 13 is a schematic view illustrating a process for burning the exhaust particles by an electric heater element 16 (116, 126). As the heater elements 16 (116, 126) are arranged on the upstream end face of the filter material 20 (120), when the elements are energized and heated, the caught exhaust particles therearound are burned and the fire flame is transmitted downwardly with the help of the current of the exhaust gas, as shown by arrows P in FIG. 13. In FIG. 13, an area indicated by A is the portion of the filter material being regenerated in which the exhaust particles are being burned, and the other area, indicated by B, is the portions of the filter material which are not being regenerated. However, it is possible, in fact, to restore the entire area of the filter material, because a plurality of heater elements are provided. Consequently, the numbers of the heater elements 16 (116, 126) and the arrangement thereof should be determined so that the exhaust particles are completely burned in the entire area of the filter material 20 (120).

In order to reduce the time necessary for the regeneration of the filter material, it may be desirable to employ a method for throttling the intake passage (i.e. a method for throttling with a throttle valve S shown in FIG. 1), in addition to the arrangement of the heater elements as described hereinbefore. For instance, if the intake passage is throttled to about 400 mmHg during the time the engine is running at an idling condition, the exhaust gas temperature is raised to about 200° C. and the exhaust gas flow is reduced, so that the cooling loss of the heater elements is reduced and, therefore, it is possible to shorten the time for the energization of the heater elements. In addition, the time necessary to regenerate the filter material may also be reduced by energizing all or several of the heater elements at once, provided that the capacity or power of electricity is sufficient.

A catalytic agent 28 may be carried on the filter material at the upstream surface thereof, such as shown in FIG. 13, so as to more easily burn the exhaust particles.

The electric heater element, such as a tungsten filament, of the ceramic heater 116 or 126 may not be damaged by the oxidization with the exhaust gas, because such an electric element is coated with a ceramic material. A catalytic agent may be carried on the outer surface of the ceramic heater element 116 or 126, so that the ignition effect of the exhaust particles is improved and the required electric power can be reduced. The ceramic heater elements 116 or 126 may be integrally moulded with a ceramic foam, which may constitute the filter material itself.

What is claimed as new and desired to be secured by Letters Patent of the United States is:

1. An exhaust particle cleaning device for a diesel engine comprising:

a trap case provided in a passageway of exhaust gas;

a filter material disposed in said trap case so that carbon particles or other exhaust particles contained in the exhaust can be caught within said filter material during the time the exhaust gas is passed through said filter material;

a plurality of ceramic heater elements spread or dispersed on the upstream end face of said filter material, so that the exhaust gas passes through the areas between said plurality of ceramic heater elements;

each of said ceramic heater elements being formed in the shape of a cross and being arranged so that the shape of the cross is seen from the direction of the exhaust gas flow;

each of said ceramic heater elements comprising an electric filament or the like coated with a ceramic material; and means for electrically controlling said plurality of heater elements.

2. A device as set forth in claim 1, wherein a catalytic agent is provided on the outer surface of each of said ceramic heater elements.

3. A device as set forth in claim 1, wherein said means for electrically controlling are adapted and constructed to periodically energize said heater elements.

* * * * *